US009055735B2

(12) United States Patent
Hiraoka

(10) Patent No.: US 9,055,735 B2
(45) Date of Patent: Jun. 16, 2015

(54) SPINNING REEL AND SPINNING-REEL REEL UNIT

(71) Applicant: Shimano Inc., Sakai, Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 94 days.

(21) Appl. No.: 13/894,933

(22) Filed: May 15, 2013

(65) Prior Publication Data

US 2013/0327870 A1 Dec. 12, 2013

(30) Foreign Application Priority Data

Jun. 7, 2012 (JP) .................................. 2012-129636
Jun. 22, 2012 (JP) .................................. 2012-140518

(51) Int. Cl.
*A01K 89/01* (2006.01)

(52) U.S. Cl.
CPC ....................................... *A01K 89/01* (2013.01)

(58) Field of Classification Search
USPC .......................................... 242/310, 311, 312
See application file for complete search history.

(56) References Cited

U.S. PATENT DOCUMENTS

| 7,413,138 B2 * | 8/2008 | Kitajima et al. | 242/311 |
| 7,628,348 B2 * | 12/2009 | Saito | 242/311 |
| 7,802,744 B2 * | 9/2010 | Saito | 242/241 |

FOREIGN PATENT DOCUMENTS

| EP | 1 949 787 A1 | 7/2008 |
| EP | 2 248 418 A1 | 11/2010 |
| JP | 2010-172252 A | 8/2010 |
| JP | 4804330 B2 | 11/2011 |

OTHER PUBLICATIONS

European Search Report of corresponding EP Application No. 13 16 9800.3 dated Oct. 14, 2013.

* cited by examiner

*Primary Examiner* — Emmanuel M Marcelo
(74) *Attorney, Agent, or Firm* — Global IP Counselors

(57) ABSTRACT

The reel unit includes a chassis, a lid member, a guard member, a tubular part, and a screw member. The chassis includes a mechanism attachment space at a lateral side thereof, a first opening extending through a front edge of the chassis, and a second opening extending through a rear edge of the chassis. The guard member includes a boss being inserted into the second opening from the rear edge of the chassis. The guard member is attached to the chassis and the lid member from behind to cover the chassis and the lid member. The tubular part is disposed between the first opening and the second opening within the mechanism attachment space and arranged to be liquid-tight. The screw member passes through the first opening and being screwed into the boss. The screw member includes a head being held inside the tubular part.

15 Claims, 10 Drawing Sheets

SPINNING REEL AND SPINNING-REEL REEL UNIT

CROSS-REFERENCE TO RELATED APPLICATIONS

This application claims priority to Japanese Patent Application Nos. 2012-129636 filed on Jun. 7, 2012 and 2012-140518 filed on Jun. 22, 2012. The entire disclosure of Japanese Patent Application Nos. 2012-129636 and 2012-140518 is hereby incorporated by herein reference.

BACKGROUND

1. Field of the Invention

The present invention relates to a spinning reel that is attachable to a fishing rod and is configured to forwardly release a fishing line, and relates to a spinning-reel reel unit.

2. Background Art

A reel unit of a spinning reel includes a chassis, a lid member, and a guard member. The chassis has an opening. The lid member is fixed to the chassis for closing the opening. A mechanism attachment space can be formed between the lid member and the chassis. The guard member covers the rear part of the chassis and that of the lid member. The guard member is screwed to the chassis. A well-known type of reel unit has a structure in which the guard member is provided with a forwardly protruding boss so as to be screwed to the chassis (e.g., see specification of Japan Patent No. 4804330). In such well-known reel unit, the front part of the chassis has a through hole and an intermediate member is disposed between the through hole and the boss. The rear part of the intermediate member is fixed to the boss by a first screw member, while the front part thereof is fixed to the through hole by a second screw member. The through hole is closed with a cap after fixation by the second screw member. Accordingly, the guard member can be easily fixed to the chassis without exposing the screw members for fixation of the guard member to the rear side of the reel unit.

In such well-known structure, the screw members for fixation of the guard member are not exposed to the rear side of the reel unit. However, two screw members are required for fixation of the guard member. A fixation work for the guard member will be complicated. Further, the cap member is attached to the through hole. However, chances are that liquid enters the mechanism attachment space through a clearance between the chassis and the boss.

SUMMARY

It is an advantage of the present invention to inhibit liquid from entering a mechanism attachment space and to easily fix a guard member without exposing a screw member to the rear side.

A reel unit for a spinning reel is provided. The spinning reel is attachable to a fishing rod. The spinning reel is configured to forwardly release a fishing line from a front side of the spinning reel. The reel unit includes a chassis, a lid member, a guard member, a tubular part, and a screw member. The chassis includes a mechanism attachment space at a lateral side thereof, a first opening extending through a front edge of the chassis, and a second opening extending through a rear edge of the chassis. The second opening is disposed on an opposite side of the first opening. The lid member is detachably attached to the chassis to close the mechanism attachment space. The guard member includes a boss being inserted into the second opening from the rear edge of the chassis. The guard member is attached to the chassis and the lid member from behind to cover the chassis and the lid member. The tubular part is disposed between the first opening and the second opening within the mechanism attachment space and arranged to be liquid-tight. The screw member passes through the first opening and being screwed into the boss. The screw member having a head being held inside the tubular part.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
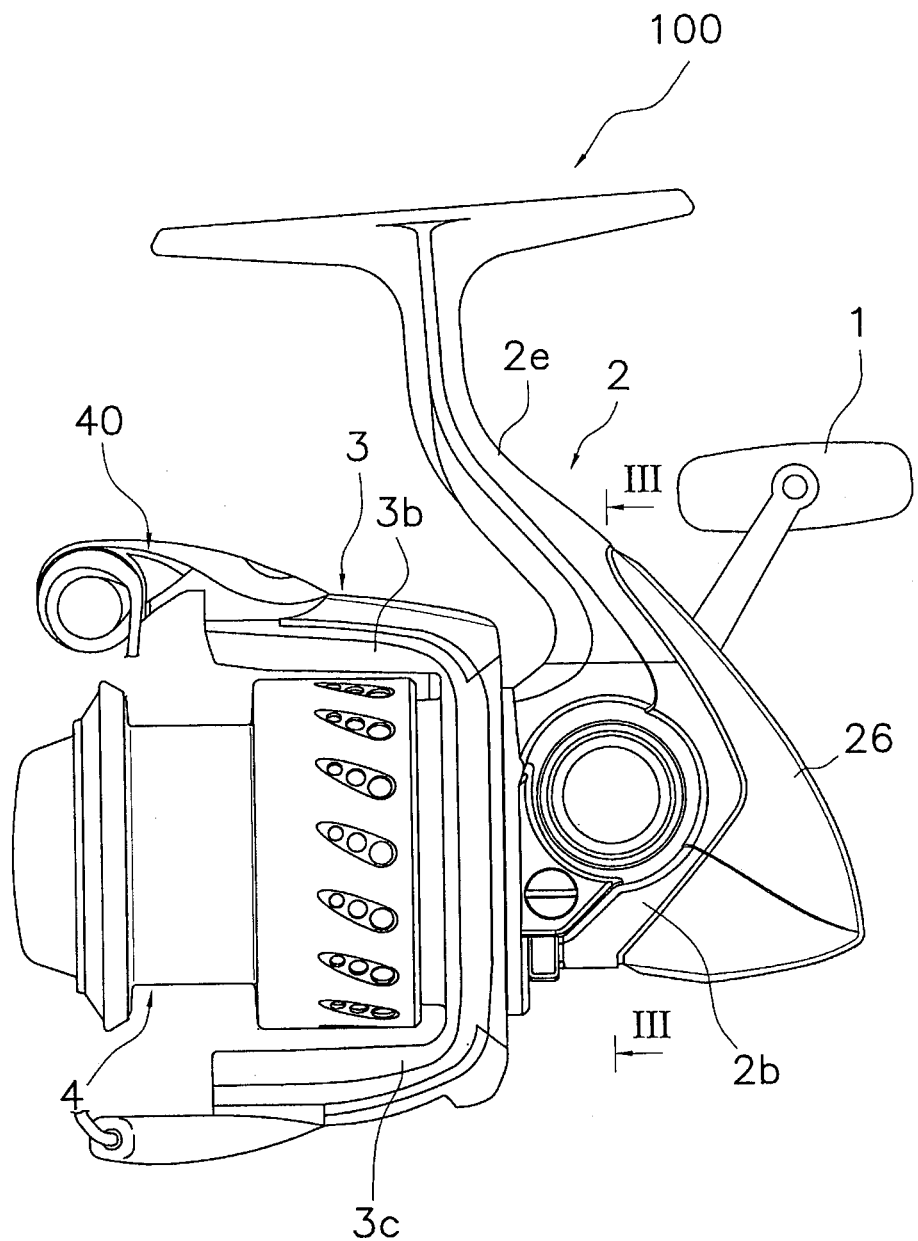
FIG. 1 is a side view of a spinning reel according to a first exemplary embodiment of the present invention.

As illustrated in FIG. 1, a spinning reel 100 according to a first exemplary embodiment of the present invention is a reel enabled to forwardly release a fishing line. The spinning reel 100 includes a handle 1, a reel unit 2 supporting the handle 1 in a rotatable state, a rotor 3, and a spool 4. The rotor 3 is rotatably supported at the front of the reel unit 2. The spool 4 is configured to wind the fishing line onto the outer peripheral surface thereof. The spool 4 is disposed at the front of the rotor 3 while being movable back and forth. It should be noted that the handle 1 is attachable to either of the right and left sides of the reel unit 2.

Reel Unit Structure

Figure 2:
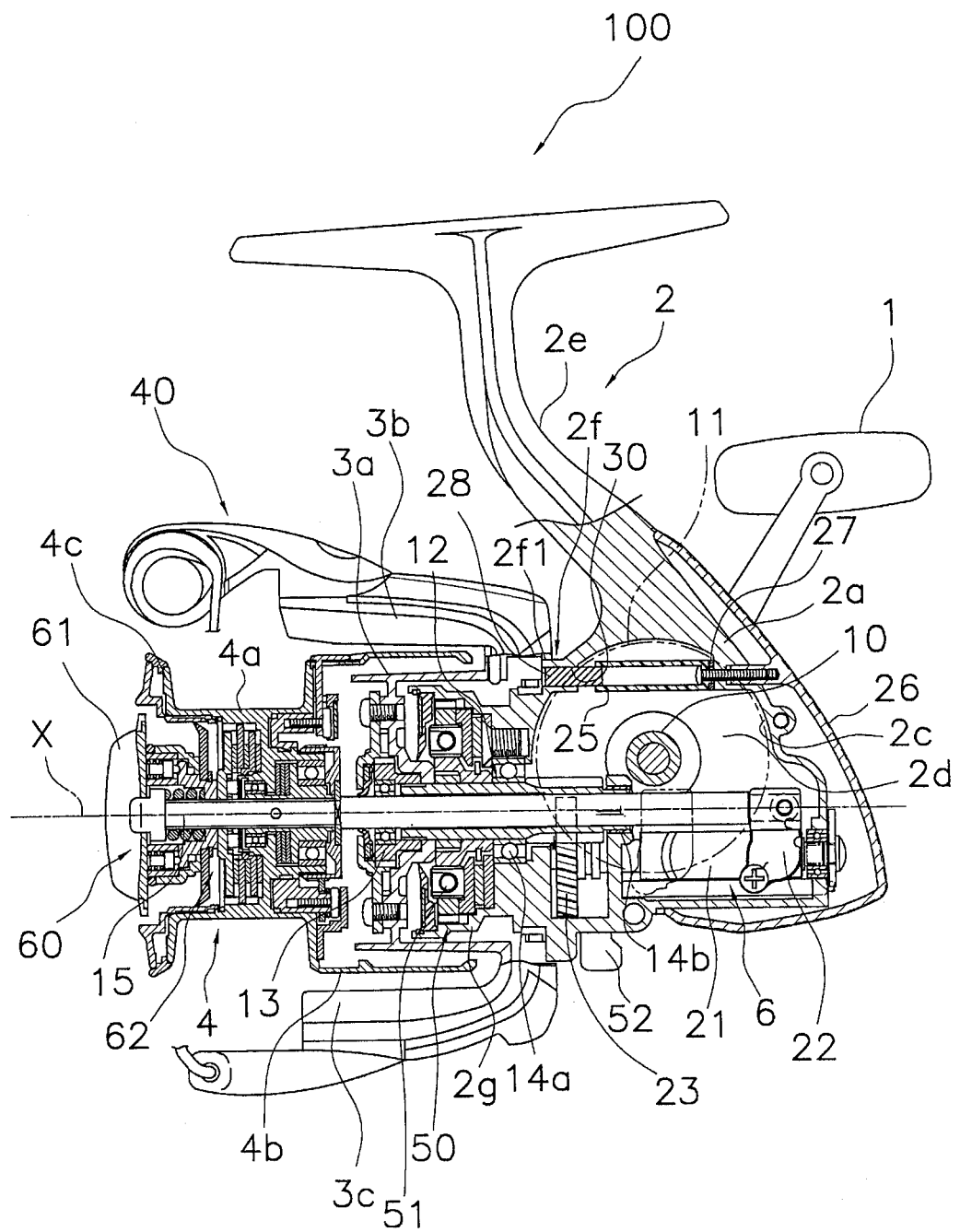
FIG. 2 is a cross-sectional side view of the spinning reel.
Figure 3:
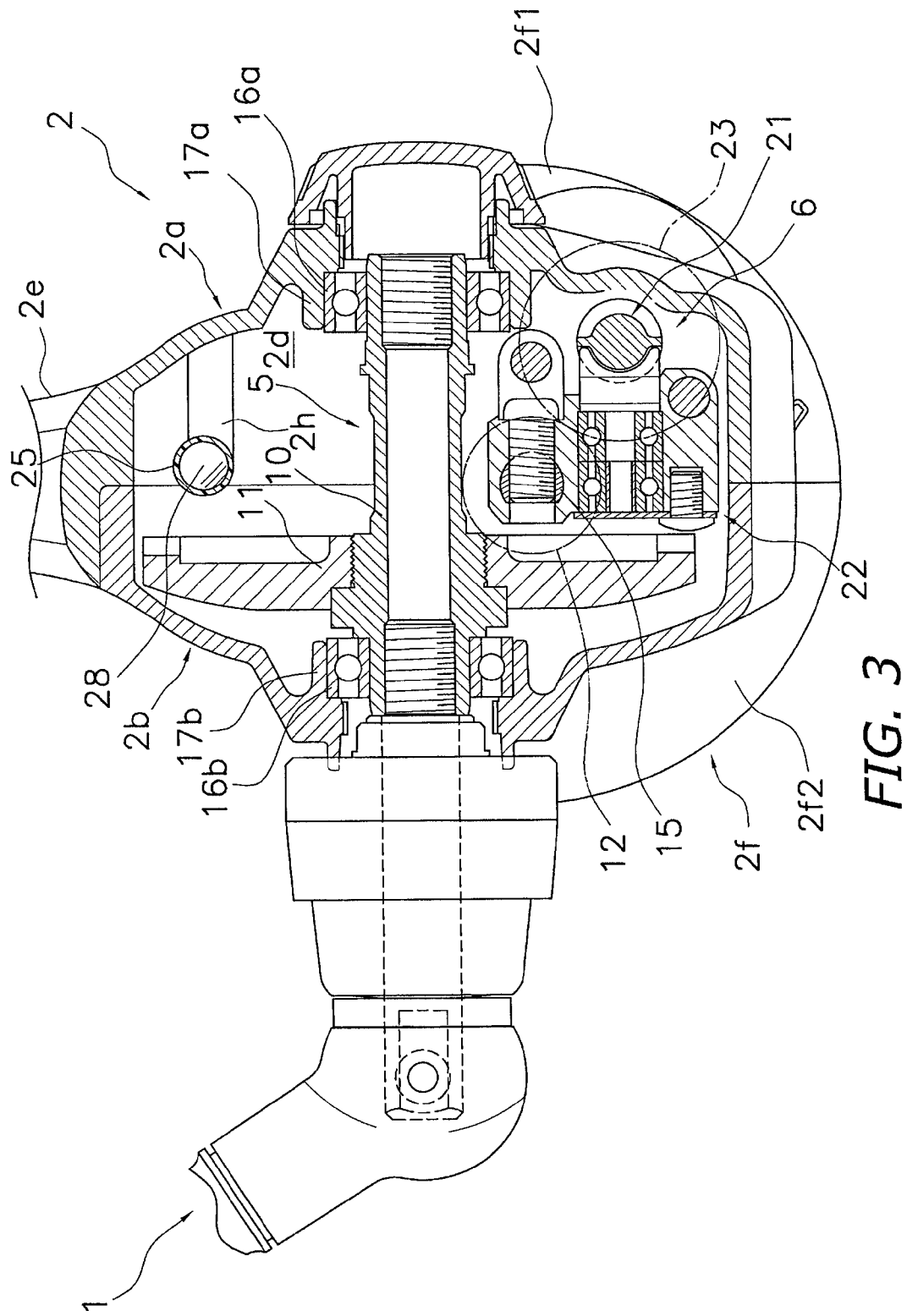
FIG. 3 is a cross-sectional view of the spinning reel taken along a cutting line in FIG. 1.

As illustrated in FIGS. 2 and 3, the reel unit 2 according to the first exemplary embodiment of the present invention includes a laterally opened chassis 2a with a mechanism attachment space 2d, a lid member 2b (see FIG. 3), a tubular part 25, a guard member 26 with a boss 26a, a screw member 27, a first seal member 28, and a second seal member 29. The chassis 2a has a first opening 30 and a second opening 31. The first opening 30 is opened through the front edge of the chassis 2a, while being continuing to the mechanism attachment space 2d. The second opening 31 is disposed oppositely to the first opening 30. The second opening 31 extends through the rear edge of the chassis 2a, while being continuing to the mechanism attachment space 2d.

Figure 4:
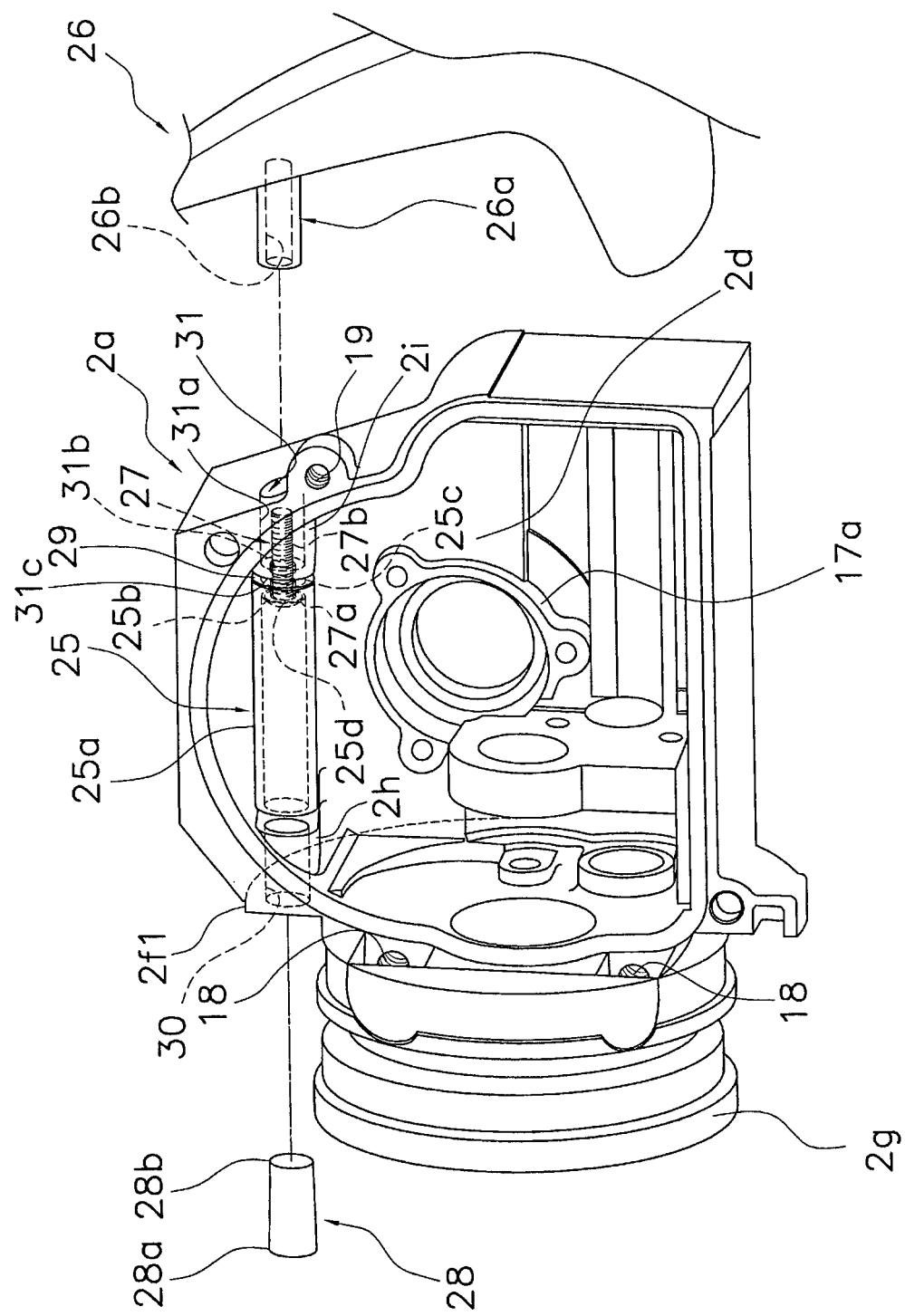
FIG. 4 is an enlarged perspective view of a chassis.
Figure 5:
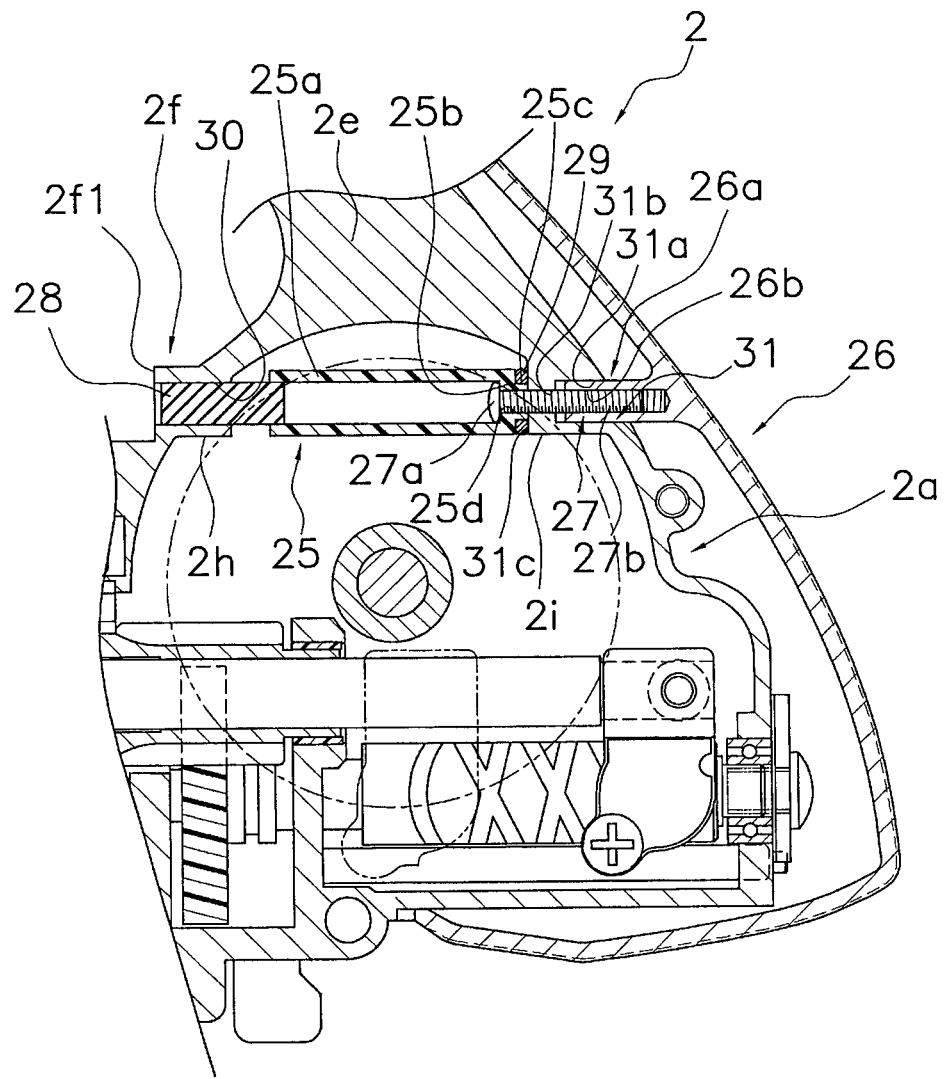
FIG. 5 is an enlarged cross-sectional side view of a rear part of a reel unit.

For example, the chassis 2a is made of light metal alloy such as magnesium alloy or aluminum alloy. A fishing rod attachment portion 2e is integrally formed with the upper part of the chassis 2a, while being extending back and forth in a T-shape. As illustrated in FIG. 2, the chassis 2a accommodates a rotor drive mechanism 5 and an oscillating mechanism 6 within the mechanism attachment space 2d. As illustrated in FIGS. 3, 4, and 5, the chassis 2a has a first flange 2f1 and a cylindrical portion 2g (see FIG. 4) on the front end thereof. The first flange 2f1 is a roughly semicircular portion forming a part of a circular flange 2f. The cylindrical portion 2g extends at its tip and has a diameter less than that of the flange 2f. The first opening 30 extends through the first flange 2f1.

The first opening 30 is formed by a round hole with an inner diameter through which the screw member 27 passes. The first opening 30 is formed in a first protruding portion 2h protruding towards the second opening 31 from the first flange 2f as the front edge of the chassis 2a. The first opening 30 is closed with the first seal member 28 after attaching of the guard member 26 by the screw member 27.

The second opening 31 is circularly formed in a second protruding portion 2i. The second protruding portion 2i is protruding towards the first opening 30 from the rear edge of the chassis 2a. The second opening 31 has a first hole portion 31a, a second hole portion 31b, and a wall portion 31c. The first hole portion 31a has a circular shape and extends through the rear edge of the chassis 2a. The second hole portion 31b is circularly formed from the first hole portion 31a towards the front edge of the chassis 2a. The wall portion 31c is a portion through which the second hole portion 31b extends. The boss 26a of the guard member 26 can be inserted into the first hole portion 31a. The second hole portion 31b has a diameter less than that of the first hole portion 31a. A threaded shaft 27b of the screw member 27 to be described can be inserted through the second hole portion 31b. The wall portion 31c is formed by a surface arranged perpendicular to the second hole portion 31b extending therethrough.

As illustrated in FIGS. 1 and 3, the lid member 2b is detachably attached to the chassis 2a in order to close the mechanism attachment space 2d. The lid member 2b is made of, for instance, light metal alloy such as magnesium alloy or aluminum alloy. The lid member 2b is fixed to the chassis 2a by, for instance, two fixation bolts (not illustrated in the figures) at two front-side positions hidden by the rotor 3. The two fixation bolts on the front side are screwed into two threaded holes 18 (see FIG. 4) formed in the front part of the chassis 2a. Further, the lid member 2b is fixed to the chassis 2a by a fixation bolt (not illustrated in the figures) at a rear-side position away from the rotor 3. The fixation bolt on the rear side is screwed into a threaded hole 19 formed in the rear part of the chassis 2a. Thus, the two fixation bolts on the front side are hidden by the rotor 3, whereas the fixation bolt on the rear side is covered with the guard member 26. Therefore, the fixation bolts for fixing the lid member 2b are not exposed to the outside of the reel unit 2. The lid member 2b has a second flange 2f2 on the front end thereof. The second flange 2f2 forms the flange 2f together with the first flange 2f1.

As illustrated in FIGS. 3, 4, and 5, the tubular part 25 is at least partially disposed between the first opening 30 and the second opening 31 within the mechanism attachment space 2d. The tubular part 25 is disposed within the mechanism attachment space 2d so as to be liquid-tight with respect to the mechanism attachment space 2d. In the first exemplary embodiment, the tubular part 25 is a member provided separately from the chassis 2a and is made of, for instance, synthetic resin such as polyamide resin or polyacetal resin. The tubular part 25 is disposed in the mechanism attachment space 2d of the chassis 2a. The tubular part 25 is disposed between the first opening 30 and the second opening 31. The tubular part 25 has a tube portion 25a, a bottom portion 25b, and a seal attachment portion 25c. The tube portion 25a is disposed in opposition to the first opening 30. A head 27a of the screw member 27 can be inserted in the tube portion 25a. The tube portion 25a has a hole with a diameter substantially the same as that of the first opening 30. The bottom portion 25b is disposed in opposition to the wall portion 31c. The bottom portion 25b has a first through hole 25d. The threaded shaft 27b of the screw member 27 can pass through the first through hole 25d. The bottom portion 25b can hold the head 27a of the screw member 27. The seal attachment portion 25c is protruding in a tubular shape towards the wall portion 31c from the bottom portion 25b. The seal attachment portion 25c is disposed while the tip thereof makes contact with the wall portion 31c. The first through hole 25d is a hole with a diameter substantially the same as that of the second hole portion 31b of the second opening 31.

As illustrated in FIGS. 2, 4, and 5, the guard member 26 is a member attached to the chassis 2a and the lid member 2b from behind for covering the chassis 2a and the lid member 2b. The guard member 26 defines the outer contour of the rear part of the reel unit 2. The guard member 26 is attached to the lid member 2b and the chassis 2a including the fishing rod attached portion 2e through a packing (not illustrated in the figures) for shape alignment. The boss 26a of the guard member 26 is formed in a rod shape such that the screw member 27 is screwed into the center thereof. The boss 26a is formed in a forwardly protruding shape and can be inserted into the second opening 31 from the rear edge of the chassis 2a. Specifically, as described above, the boss 26a can be inserted into the first hole portion 31a of the second opening 31. The boss 26a has a female threaded portion 26b in the center thereof. The screw member 27 is screwed into the female threaded portion 26b. The female threaded portion 26b is extending to an axially intermediate position in the boss 26a. The boss 26a has a length enabled to produce a clearance between the tip thereof and a step produced between the first hole portion 31a and the second hole portion 31b when the guard member 26 is fixed.

As illustrated in FIG. 4, the screw member 27 is a member having the head 27a and the threaded shaft 27b. The threaded shaft 27b has a diameter less than that of the head 27a and has a male threaded portion on the outer periphery thereof. In the present exemplary embodiment, the screw member 27 is a bolt member to be screwed into the female threaded portion 26b formed in the boss 26a. However, the screw member can be a self-tapping screw enabled to create a female threaded portion within the boss 26a. The screw member 27 is attached to the tubular part 25 before the spinning reel 100 is assembled. In assembling the spinning reel 100, the tip of a tightening tool (e.g., a screwdriver) is inserted into the tubular part 25 via the first opening 30, and the screw member 27 is turned by the tightening tool. The screw member 27 is accordingly crewed into the boss 26a of the guard member 26. Consequently, the guard member 26 and the tubular part 25 are fixed to the chassis 2a.

The first seal member 28 seals the clearance between the tubular part 25 and the first opening 30. The first seal member 28 is fitted to the inner peripheral surface of the first opening 30 and that of the tube portion 25a of the tubular part 25. The first seal member 28 is an elastic member made of synthetic rubber or the like. As illustrated in FIG. 4, the first seal member 28 is a truncated cone member having a first end 28a and a second end 28b. The first end 28a is fitted into the first opening 30, while the second end 28b is fitted into the tube portion 25a of the tubular part 25. The first end 28a has an outer diameter greater than that of the second end 28b. The outer diameter of the first end 28a of the first seal member 28 is greater than the inner diameter of the first opening 30, whereas the outer diameter of the second end 28b is slightly less than the inner diameter of the tube portion 25a of the tubular part 25. Thus, the first seal member 28 is tapered and can be easily attached to the tubular part 25 via the first opening 30. With thus structured first seal member 28, liquid can be prevented from entering the mechanism attachment space 2d both from the inside of the tubular part 25 and from the first opening 30.

The second seal member 29 seals the clearance between the tubular part 25 and the second opening 31. The second seal member 29 is an O-ring to be attached onto the seal attachment portion 25c. The wire diameter of the O-ring is greater than the protruding length of the seal attachment portion 25c. With the structure, the second seal member 29 is interposed and slightly compressed between the wall portion 31c and the bottom portion 25b, while the tip surface of the seal attachment portion 25c makes contact with the wall portion 31c. Thus, the second seal member 29 seals the clearance between the bottom portion 25b and the wall portion 31c. As a result, even when liquid enters the second opening 31, the liquid can be prevented from further entering the mechanism attachment space 2d from the tubular part 25.

In the reel unit 2, the screw member 27 for attaching the guard member 26 is covered with the first seal member 28. Therefore, a simple appearance can be obtained without exposing the screw member 27 to the outside. Further, the clearance between the first opening 30 and the tubular part 25 is sealed by the first seal member 28, whereas the clearance between the second opening 31 and the tubular part 25 is sealed by the second seal member 29. Therefore, liquid can be inhibited from entering the mechanism attachment space 2d, while the guard member 26 can be easily fixed without exposing the screw member 27 to the rear side. Further, the screw members for fixing the lid member 2b to the chassis 2a are also hidden by the rotor 3 and the guard member 26. Thus, such fixation bolts are not exposed to the outside.

Other Components of Spinning Reel

As illustrated in FIG. 3, the rotor drive mechanism 5 includes a drive shaft 10, a drive gear 11, and a pinion gear 12. The drive shaft 10 is a member to which the handle 1 is fixed. The drive gear 11 is of a face gear type provided integrally with or separately from the drive shaft 10. The pinion gear 12 is meshed with the drive gear 11. As illustrated in FIG. 3, the drive shaft 10 is rotatably supported by the reel unit 2 through a first bearing 16a and a second bearing 16b. The first bearing 16a is attached into a first boss 17a disposed inside the chassis 2a. The second bearing 16b is attached into a second boss 17b disposed inside the lid member 2b. The drive gear 11 is disposed while the outer peripheral part thereof is opposed to the tubular part 25 disposed inside the chassis 2a in the axial direction of the drive shaft 10. In other words, the tubular part 25 is disposed in avoidance of contact with the drive gear 11. Thus, even when the tubular part 25 is disposed, increase in diameter of the drive gear 11 is not thereby impeded. Therefore, the drive gear 11 of the present exemplary embodiment has a larger diameter and a greater number of teeth than a well-known drive gear.

As illustrated in FIG. 2, the pinion gear 12 is formed in a tubular shape, and the front part thereof is fixed to the rotor 3 by a nut 13 while penetrating through the center part of the rotor 3. Further, the axially intermediate part and the axially rear end of the pinion gear 12 are rotatably supported by the reel unit 2 through a bearing 14a and a bearing 14b, respectively.

As illustrated in FIGS. 2 and 3, the oscillating mechanism 6 is a mechanism configured to move a spool shaft 15 coupled to the center part of the spool 4 through a drag mechanism 60 in a back-and-forth direction and thereby move the spool 4 in the same direction as the spool shaft 15. The oscillating mechanism 6 includes a traverse cam shaft 21, a slider 22, and an intermediate gear 23. The traverse cam shaft 21 is disposed below and in parallel to the spool shaft 15. The slider 22 is configured to move along the traverse cam shaft 21 in the back-and-forth direction. The intermediate gear 23 is fixed to the tip of the traverse cam shaft 21. The rear end of the spool shaft 15 is fixed to the slider 22 while being non-rotatable. The intermediate gear 23 is meshed with the pinion gear 12.

As illustrated in FIG. 2, the rotor 3 is rotatable with respect to the reel unit 2 about a first axis X arranged in the back-and-forth direction. The rotor 3 is coupled to the pinion gear 12 while being unitarily rotatable therewith. The rotor 3 includes a rotor body 3a, a first rotor arm 3b, and a second rotor arm 3c. The rotor body 3a is formed in a roughly tubular shape and is coupled to the pinion gear 12. The first and second rotor arms 3b and 3c are extending from the both lateral sides of the rotor body 3a. Further, the rotor 3 includes a bail arm 40 pivotably coupled to the first and second rotor arms 3b and 3c. The bail arm 40 is disposed for winding the fishing line onto the spool 4.

The rotor 3 is configured to be switchable between a reverse rotation prevention state and a reverse rotation permission state by an anti-reverse mechanism 50 including a roller-type one-way clutch 51. The switching operation can be executed by a switch lever 52 disposed in the lower part of the reel unit 2.

As illustrated in FIG. 2, the spool 4 is disposed between the first and second rotor arms 3b and 3c of the rotor 3. The spool 4 is mounted to the tip of the spool shaft 15 through the drag mechanism 60. The spool 4 has a bobbin trunk 4a, a skirt 4b, and a flange 4c. The bobbin trunk 4a is a portion that the fishing line is wound about the outer periphery thereof. The skirt 4b is a tubular portion integrally formed with the rear end of the bobbin trunk 4a. The flange 4c is a large-diameter portion disposed on the front end of the bobbin trunk 4a.

The drag mechanism 60 is configured to brake rotation of the spool 4. The drag mechanism 60 includes a drag regulation knob 61 and a braking part 62. The drag regulation knob 61 is screwed onto the tip of the spool shaft 15. The braking part 62 is configured to brake the spool 4 while being pressed by the drag regulation knob 61.

Procedure of Assembling Reel Unit

In thus structured spinning reel, the rotor drive mechanism 5 and the oscillating mechanism 6 are attached to the inside of the reel unit 2, while the anti-reverse mechanism 50 is attached to the inside of the cylindrical portion 2g. Further, the screw member 27 and the second seal member 29 are attached to the tubular part 25, and the tubular part 25 is temporarily disposed within the mechanism attachment space 2d of the chassis 2a by the screw member 27. Under the condition, the chassis 2a is covered with the lid member 2b. The lid member 2b is then fixed to the chassis 2a by the fixation bolts (not illustrated in the figures). Next, the guard member 26 is attached to the chassis 2a and the lid member 2b from behind. At this time, the boss 26a of the guard member 26 is inserted into the first hole portion 31a of the second opening 31. Then, the screw member 27 is screwed into the boss 26a using the tightening tool (e.g., a screwdriver) inserted through the first opening 30. The guard member 26 and the tubular part 25 are thereby fixed to the chassis 2a. With the aforementioned procedure, an assembling work of the reel unit 2 is finished.

In this case, the clearance between the tubular part 25 and the first opening 30 is sealed by the first seal member 28, whereas the clearance between the tubular part 25 and the second opening 31 is sealed by the second seal member 29. Further, the guard member 26 and the tubular part 25 are fixed to the chassis 2a by screwing the single screw member 27, disposed inside the tubular part 25, into the boss 26a inserted into the second opening 31 from the rear side. Therefore, the guard member 26 can be easily fixed to the chassis 2a without exposing the screw member 27 to the rear side, while liquid can be inhibited from entering the mechanism attachment space 2d.

Modification of First Exemplary Embodiment

Figure 6:
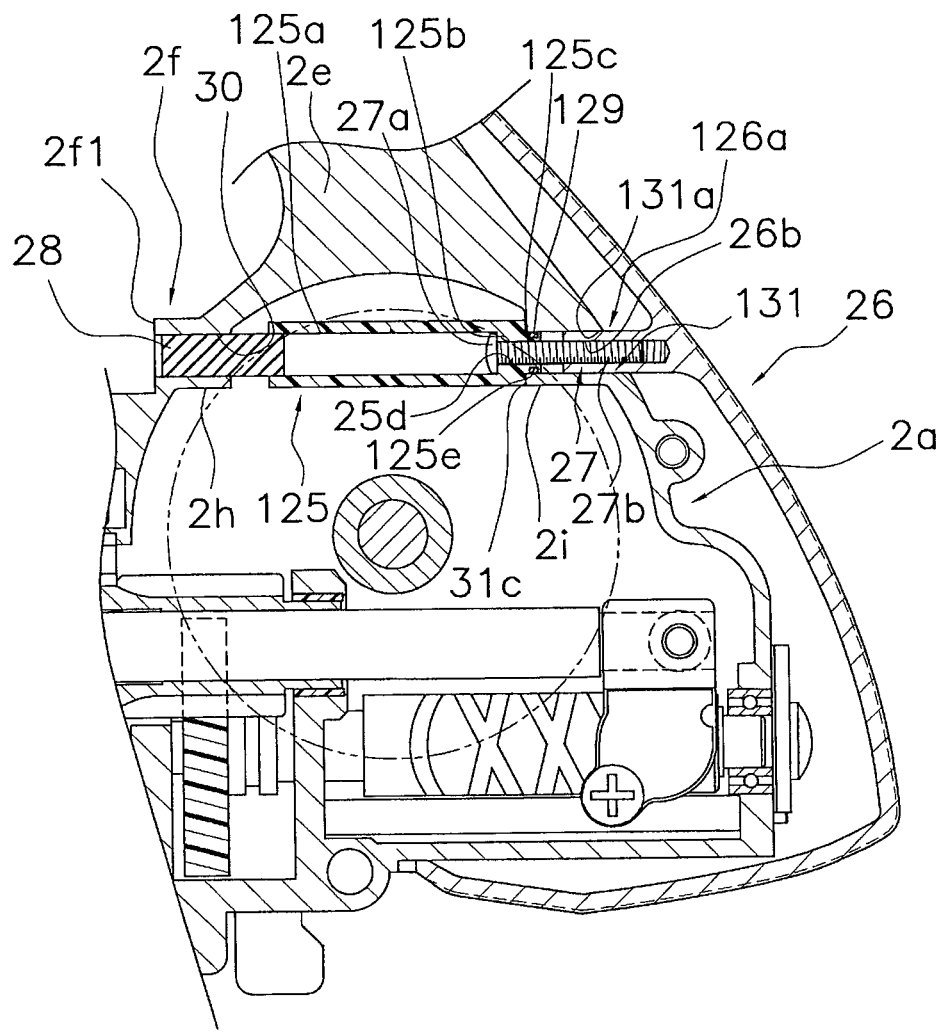
FIG. 6 is a diagram corresponding to FIG. 5 and illustrates an enlarged cross-sectional side view of a rear part of a reel unit according to a modification of the first exemplary embodiment.

In the first exemplary embodiment, the tip of the seal attachment portion 25c of the tubular part 25 makes contact with the wall portion 31c of the second opening 31. However, the present invention is not limited to the structure. As illustrated in FIG. 6, in a modification of the first exemplary embodiment, a second opening 131 is formed only by a first hole portion 131a that a boss 126a can be inserted therein. A seal attachment portion 125c of a tubular part 125 is fitted into the first hole portion 131a of the second opening 131. In the modification, the seal attachment portion 125c has an annular groove 125e on the outer peripheral surface thereof for attaching thereto a second seal member 129. The second seal member 129 seals the clearance between the seal attachment portion 125c and the inner peripheral surface of the first hole portion 131a. Further, a bottom portion 125b of the tubular part 125 makes contact with the wall portion 31c of the second opening 131. The other components are the same as the corresponding ones of the first exemplary embodiment. Therefore, the same reference numerals are assigned to the same components as those used in the first exemplary embodiment, and explanation thereof will be hereinafter omitted.

According to the structure of the modification of the first exemplary embodiment, the tubular part 125 can be easily held when temporarily held within the mechanism attachment space 2d.

Second Exemplary Embodiment

Figure 7:
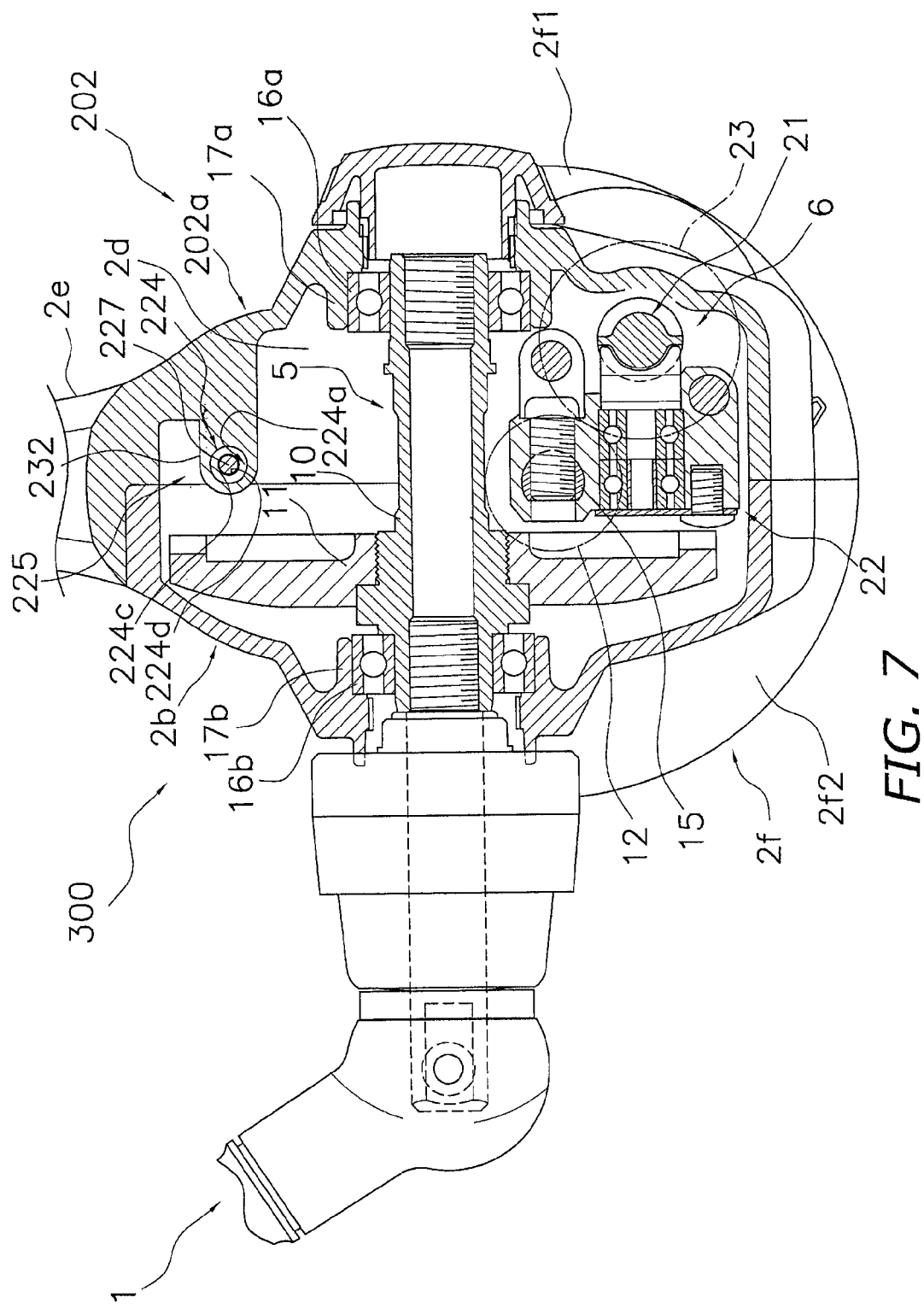
FIG. 7 is a diagram corresponding to FIG. 3 and illustrates a cross-sectional view of a spinning reel according to a second exemplary embodiment.
Figure 8:
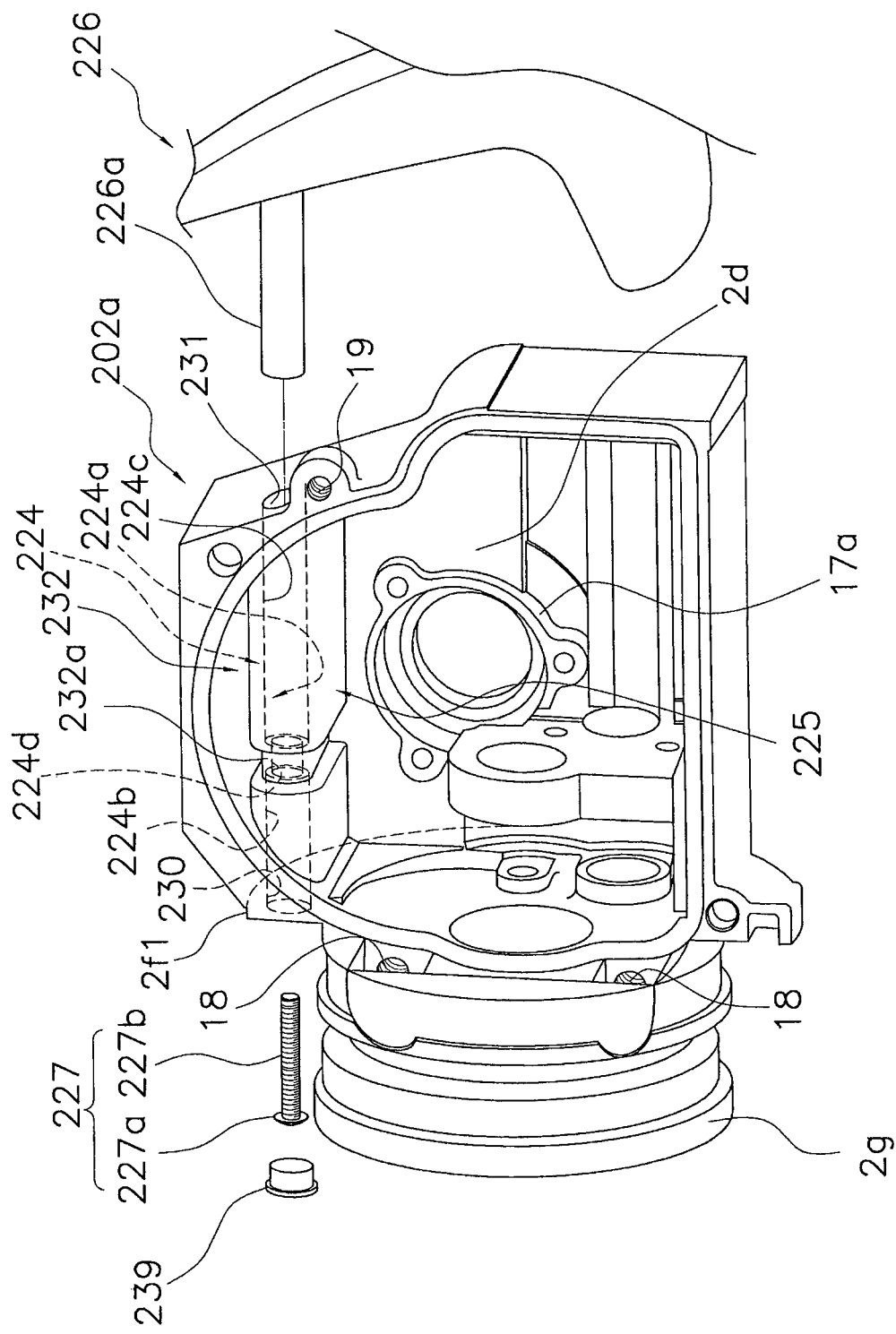
FIG. 8 is a diagram corresponding to FIG. 4 and illustrates an enlarged perspective view of a chassis according to the second exemplary embodiment.
Figure 9:
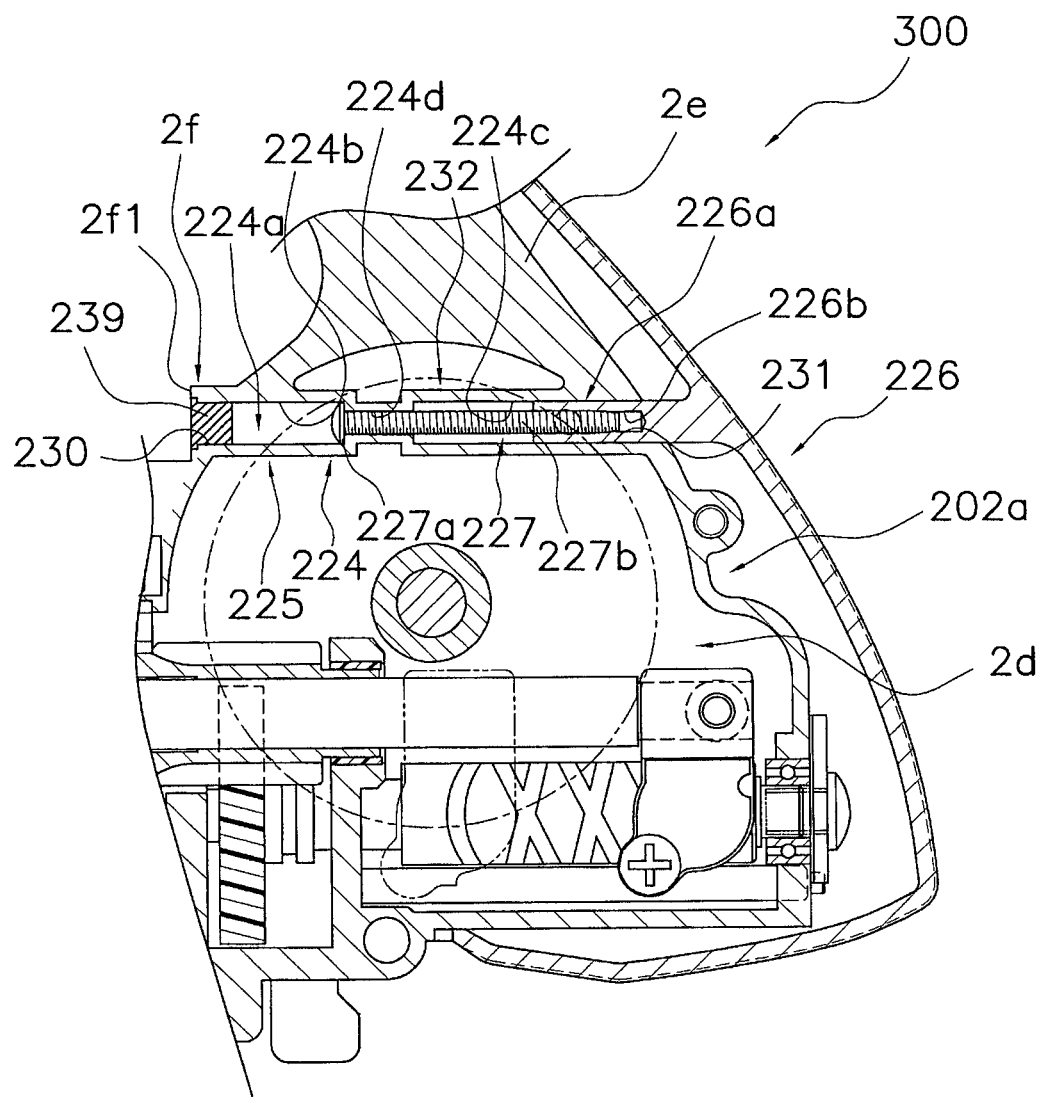
FIG. 9 is a diagram corresponding to FIG. 5 and illustrates an enlarged cross-sectional side view of a rear part of a reel unit according to the second exemplary embodiment.

In the first exemplary embodiment, the tubular part 25 is disposed separately from the chassis 2a. In the second exemplary embodiment, as illustrated in FIGS. 7, 8, and 9, a tubular part 225 of a reel unit 202 of a spinning reel 300 is integrally formed with a chassis 202a. Further, a first opening 230 and a second opening 231 are continuing to a second through hole 224a without being continuing to the mechanism attachment space 2d. The tubular part 225 has the second through hole 224a and a penetrating part 224. The second through hole 224a penetrates through the mechanism attachment space 2d in the back-and-forth direction. The penetrating part 224 is sealed to be liquid-tight with respect to the mechanism attachment space 2d. It should be noted that in the following explanation and drawings, the same reference numerals are assigned to members structured similarly to the corresponding ones of the first exemplary embodiment, and explanation thereof will be hereinafter omitted.

The first flange 2f1 has the first opening 230 formed by a round hole. The first opening 230 is configured to continue to the penetrating part 224. The first opening 230 is closed by a cap 239 after a guard member 226 is attached by a screw member 227. The chassis 202a has a protruding part 232 formed on the upper part of the inner lateral surface. The protruding part 232 is formed in a shape protruding towards the lid member 2b. The protruding part 232 is extending along the back-and-forth direction, while connecting the front edge and the rear edge of the chassis 202a. The second through hole 224a of the penetrating part 224 is formed in the protruding part 232, while penetrating through the front edge and the rear edge of the chassis 202a. Therefore, the penetrating part 224 is sealed to be liquid-tight with respect to the mechanism attachment space 2d.

As illustrated in FIGS. 8 and 9, the second through hole 224a has a first portion 224b, a second portion 224c, and a third portion 224d. The first portion 224b is continuing to the first opening 230. The first portion 224b is a hole formed in the front part of the chassis 202a and a head 227a of the screw member 227 is inserted in the hole. The second portion 224c is a hole formed in the rear part of the cassis 202a and a boss 226a (to be described) of the guard member 226 is inserted in the hole. The second portion 224c is continuing to the second opening 231. The third portion 224d is disposed between the first portion 224b and the second portion 224c. The third portion 224d is a hole with a diameter less than that of the first portion 224b and a shaft 227b of the screw member 227 is inserted in the hole. The head 227a of the screw member 227 is held by a step produced between the first portion 224b and the third portion 224d. The shaft 227b penetrates through the third portion 224d and reaches the second portion 224c. The boss 226a is inserted into the second portion 224c. The tip of the boss 226a is disposed rearwards of a step produced between the second portion 224c and the third portion 224d.

As illustrated in FIG. 8, an intermediate portion 232a of the protruding part 232, corresponding to the third portion 224d, is formed along with the shape of the second through hole 224a and has a diameter less than that of the both sides thereof. In this case, the protruding part 232 and the penetrating part 224 are formed with an even thickness. Therefore, sink marks are less easily produced in die molding, and further, it is possible to prevent deformation of the holes of the penetrating part 224 attributed to such sink marks.

The guard member 226 is structured similarly to the guard member 26 of the first exemplary embodiment. It should be noted that the boss 226a has a length greater than that of the boss 26a of the first exemplary embodiment. The boss 226a is formed in such a shape that it can protrude from the rear part of the chassis 202a towards the second through hole 224a of the penetrating part 224. As described above, the boss 226a can be inserted into the second portion 224c of the penetrating part 224. As illustrated in FIG. 9, the boss 226a has a screwed recess 226b in the center thereof. The screw member 227 is screwed into the screwed recess 226b. The screwed recess 226b is extending to an axially intermediate position in the boss 226a.

As illustrated in FIG. 9, the screw member 227 is a member having the head 227a and the shaft 227b. The shaft 227b has a diameter less than that of the head 227a, and has a male threaded portion on the outer peripheral part thereof. In the second exemplary embodiment, a self-tapping screw, enabled to form a female threaded portion, is used as the screw member 227. However, a normal bolt, screwed into a female threaded portion, can be used as the screw member. In this case, the female threaded portion is formed on the screwed recess. The screw member 227 is inserted into the penetrating part 224 from the front part of the chassis 202a, and is screwed into the boss 226a of the guard member 226. Accordingly, the guard member 226 is fixed to the chassis 202a.

In the reel unit 202, the screw member 227, provided for attaching of the guard member 226, is covered with the cap 239. Therefore, a simple appearance can be obtained without exposing the screw member 227 to the outside. Further, the screw member 227 is attached to the penetrating part 224 sealed to be liquid-tight with respect to the mechanism attachment space 2d. Yet further, the boss 226a of the guard member 226 is also disposed in the penetrating part 224. Under the condition, the guard member 226 is fixed to the chassis 202a by the screw member 227. Therefore, the guard member 226 can be easily fixed without exposing the screw member 227 to the rear side, while liquid can be inhibited from entering the mechanism attachment space 2d. Further, the screw members, provided for fixing the lid member 2b to the chassis 202a, are also hidden by the rotor 3 and the guard member 226. Thus, these screw members are also not exposed to the outside.

Procedure of Assembling Reel Unit

In thus structured spinning reel, the rotor drive mechanism 5 and the oscillating mechanism 6 are attached to the inside of the reel unit 202, while the anti-reverse mechanism 50 is attached to the inside of the cylindrical portion 2g. Under the condition, the chassis 202a is covered with the lid member 2b. The lid member 2b is then fixed to the chassis 202a by the fixation bolts (not illustrated in the figures). Next, the guard member 226 is attached to the chassis 202a and the lid member 2b from behind. At this time, the boss 226a of the guard member 226 is inserted into the second portion 224c of the second through hole 224a. Further, the screw member 227 is inserted from the first portion 224b, and is screwed into the boss 226a using a tool (e.g., a screwdriver). The guard member 226 is thereby fixed to the chassis 202a. With the aforementioned procedure, an assembling work of the reel unit 202 is finished.

In this case, the guard member 226 is fixed to the chassis 202a by screwing the single screw member 227 inserted from the front part into the boss 226a inserted from the rear part within the penetrating part 224 sealed to be liquid tight with respect to the mechanism attachment space 2d. Therefore, the guard member 226 can be easily fixed without exposing the screw member 227 to the rear side, while liquid can be prevented from entering the mechanism attachment space 2d.

Third Exemplary Embodiment

Figure 10:
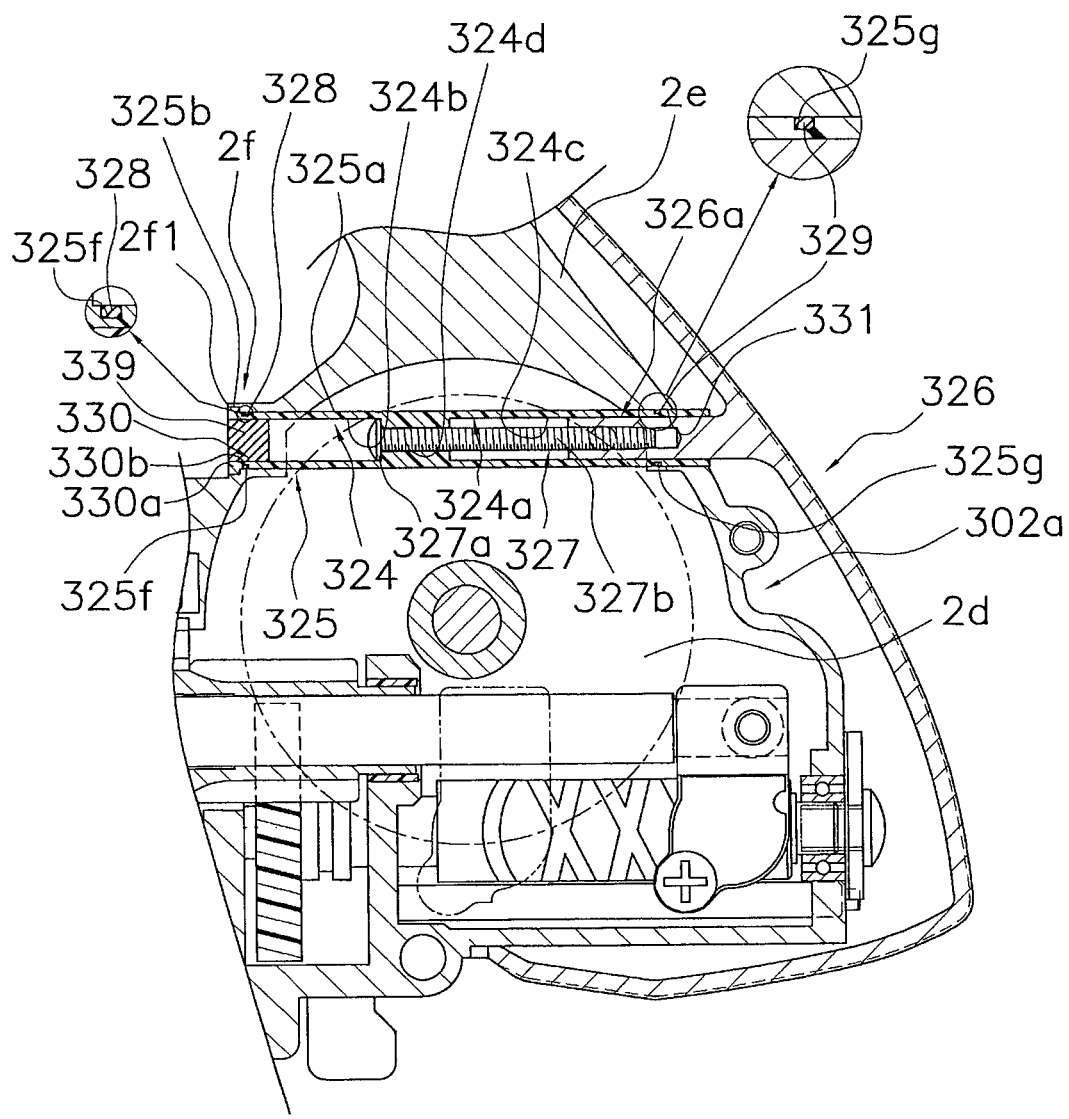
FIG. 10 is a diagram corresponding to FIG. 5 and illustrates an enlarged cross-sectional side view of a rear part of a reel unit according to a third exemplary embodiment.

In the aforementioned first exemplary embodiment, the tubular part 25 is disposed only in the mechanism attachment space 2d. However, the present invention is not limited to the structure. In a reel unit 302 illustrated in FIG. 10, a tubular part 325 is disposed while penetrating through first and second openings 330 and 331 of a chassis 302a. Therefore, the tubular part 325 is disposed across the mechanism attachment space 2d. The first opening 330 has a third hole portion 330a with a large diameter and a fourth hole portion 330b with a small diameter. The second opening 331 is formed such that the tubular part 325 penetrates therethrough.

The tubular part 325 has a tube portion 325a and a brimmed portion 325b. The tube portion 325a has a diameter less than that of the brimmed portion 325b. The brimmed portion 325b is a large-diameter portion for a positioning purpose, and is held by a step produced between the third hole portion 330a and the fourth hole portion 330b. The tubular part 325 further includes a penetrating part 324 having a second through hole 324a. The second through hole 324a has a first portion 324b, a second portion 324c and a third portion 324d. The first portion 324b has an inner diameter that a head 327a of a screw member 327 can be inserted therein. The second portion 324c has an inner diameter that a boss 326a of a guard member 326 can be inserted therein. The third portion 324d is a small-diameter portion disposed between the first portion 324b and the second portion 324c. The third portion 324d has an inner diameter that a threaded shaft 327b of the screw member 327 can pass therethrough. The rear end of the tube portion 325a is protruding rearwards of the chassis 302a.

The tip of the boss 326a of the guard member 326 is disposed rearwards of a step produced between the second portion 324c and the third portion 324d.

The head 327a of the screw member 327 is held by the step produced between the first portion 324b and the third portion 324d. The threaded shaft 327b is screwed into the boss 326a while penetrating the third portion 324d. For example, the screw member 327 is a self-tapping screw.

A first seal member 328 is disposed between the outer peripheral surface of the front part of the tube portion 325a and the first opening 330 in order to seal the clearance between the tubular part 325 and the first opening 330. As illustrated in the enlarged view of FIG. 10, the first seal member 328 is attached to a first annular groove 325f formed on the outer peripheral surface of the tube portion 325a.

A second seal member 329 is disposed between the outer peripheral surface of the rear part of the tube portion 325a and the second opening 331 in order to seal the clearance between the tubular part 325 and the second opening 331. As illustrated in the enlarged view of FIG. 10, the second seal member 329 is attached to a second annular groove 325g formed on the outer peripheral surface of the rear part of the tube portion 325a. The first seal member 328 and the second seal member 329 are O-rings. The front-side opened part of the first portion 324b of the tubular part 325 is closed with a cap member 339 made of, for instance, elastic material.

In thus formed reel unit 302, the tubular part 325, to which the first and second seal members 328 and 329 are attached, is preliminarily inserted from the first opening 330, is penetrated through the second opening 331, and is pressed into the chassis 302a until the brimmed portion 325b makes contact with the step produced between the third hole portion 330a and the fourth hole portion 330b. When it is completed to assemble mechanisms such as the rotor drive mechanism 5 and the oscillating mechanism 6 to the inside of the mechanism attachment space 2d, the boss 326a of the guard member 326 is inserted into the second portion 324c of the penetrating part 324. Then, the screw member 327 is inserted from the first portion 324b, and is screwed until the guard member 326 makes contact with the chassis 302a and a lid member (not illustrated in the figure) while the brimmed portion 325b makes contact with the step produced between the third hole portion 330a and the fourth hole portion 330b of the first opening 330. Accordingly, the guard member 326 and the tubular part 325 are fixed to the chassis 302a.

In thus structured reel unit 302, the front-side and rear-side outer peripheral portions of the tubular part 325 are sealed with the first seal member 328 and the second seal member 329. Therefore, liquid can be prevented from entering the mechanism attachment space 2d through the clearance between the tubular part 325 and the first opening 330 and that between the tubular part 325 and the second opening 331. Further, the tubular part 325 is disposed while penetrating through the front edge and the rear edge of the chassis 302a. Therefore, even when entering the inside of the tubular part 325, liquid can be prevented from entering the mechanism attachment space 2d. The other components are the same as the corresponding ones of the first exemplary embodiment. Therefore, detailed explanation thereof will be hereinafter omitted.

It should be noted that in the third exemplary embodiment, the tubular part 325 is detachably attached to the first opening 330 and the second opening 331. However, the tubular part 325 can be fixed to the first opening 30 and the second opening 331 by an arbitrary fixation method such as adhesion, press-fitting or the like. In this case, the brimmed portion 325b for a positioning purpose is not required to be provided. Thus, the mechanism attachment space 2d can be liquid tight by fixing the tubular part 325 without using a seal member.

Features

The aforementioned exemplary embodiments can be expressed as follows.

(A) The reel unit 2 is attachable to a fishing rod and is used for the spinning reel 100 configured to forwardly release the fishing line. The reel unit 2 includes the chassis 2a, the lid member 2b, the guard member 26, the tubular part 25 and the screw member 27. The chassis 2a has the mechanism attachment space 2d, the first opening 30 and the second opening 31. The mechanism attachment space 2d is configured at a lateral side of the chassis 2a. The first opening 30 is extending through the front edge of the chassis 2a while being continuing to the mechanism attachment space 2d. The second opening 31 is disposed on the opposite side of to the first opening 30. The second opening 31 is extending through the rear edge of the chassis 2a while being continuing to the mechanism attachment space 2d. The lid member 2b is detachably attached to the chassis 2a for closing the mechanism attachment space 2d. The guard member 26 is attached to the chassis 2a and the lid member 2b from behind for covering the chassis 2a and the lid member 2b. The guard member 26 has the boss 26a which is inserted into the second opening 31 from the rear edge of the chassis 2a. The tubular part 25 is disposed between the first opening 30 and the second opening 31 within the mechanism attachment space 2d so as to be liquid-tight with respect to the mechanism attachment space 2d. The screw member 27 passes through the first opening 30, and is screwed into the boss 26a while the head 27a thereof is held inside the tubular part 25.

In the reel unit 2, the guard member 26 is fixed to the chassis 2a by the single screw member 27 that the head 27a thereof is held by the tubular part 25. The tubular part 25 is disposed between the first opening 30 and the second opening 31 within the mechanism attachment space 2d so as to be liquid-tight with respect to the mechanism attachment space 2d. Therefore, liquid is prevented from entering the mechanism attachment space 2d from the inside of the tubular part 25. Further, the guard member 26 can be fixed to the chassis 2a by the single screw member. Therefore, liquid can be inhibited from entering the mechanism attachment space 2d, while the guard member 26 can be easily fixed without exposing the screw member 27 to the rear side.

(B) In the reel unit 2, the first opening 30 and the second opening 31 are respectively continuing to the mechanism attachment space 2d. The tubular part 25 is at least partially disposed between the first opening 30 and the second opening 31 within the mechanism attachment space 2d. The reel unit 2 further includes the first seal member 28 and the second seal member 29. The first seal member 28 seals the clearance between the tubular part 25 and the first opening 30. The second seal member 29 seals the clearance between the tubular part 25 and the second opening 31.

(C) In the reel unit 2, the second opening 31 has the first hole portion 31a, the second hole portion 31b and the wall portion 31c. The first hole portion 31a is extending to the rear edge of the chassis 2a and the boss 26a is inserted in the first hole portion 31a. The second hole portion 31b is formed towards the front edge of the chassis 2a from the first hole portion 31a and the threaded shaft 27b of the screw member 27 passes therethrough. The second hole portion 31b has a diameter less than that of the first hole portion 31a. The wall portion 31c has the second hole portion 31b extending therethrough, and has a surface disposed perpendicular to the second hole portion 31b. The tubular part 25 is disposed within the mechanism attachment space 2d. The tubular part 25 has the tube portion 25a and the bottom portion 25b. The tube portion 25a is disposed in opposition to the first opening 30. The head 27a of the screw member 27 is inserted in the tube portion 25a. The bottom portion 25b is disposed in opposition to the wall portion 31c. The bottom portion 25b has the first through hole 25d through which the threaded shaft 27b passes. The bottom portion 25b is enabled to hold the head 27a. The first seal member 28 is fitted to the first opening 30 and the tube portion 25a.

(D) In the reel unit 2, the first seal member 28 is a truncated cone member made of elastic material, and the first end 28a thereof fitted to the first opening 30 has a diameter greater than that of the second end 28b thereof fitted to the tube portion 25a. In this case, the first seal member 28 is tapered that is attached to the tube portion 25a through the first opening 30. Therefore, the first seal member 28 can be easily attached to the tube portion 25a.

(E) In the reel unit 2, the second seal member 29 is disposed between the wall portion 31c and the bottom portion 25b. The tubular part 25 has the seal attachment portion 25c circularly protruding towards the wall portion 31c from the bottom portion 25b. The second seal member 29 is attached onto the outer peripheral surface of the seal attachment portion 25c. In this case, the second seal member 29, disposed between the wall portion 31c and the bottom portion 25b, is attached to the seal attachment portion 25c. Therefore, the second seal member 29 can be reliably attached thereto.

(F) In the reel unit 2, the second seal member 29 is an O-ring attachable to the seal attachment portion 25c. In this case, the clearance between the tubular part 25 and the second opening 31 can be sealed by a commercially available O-ring.

(G) In the reel unit 302, the tubular part 325 is detachably attached to the first opening 330 and the second opening 331. In this case, attaching of the tubular part 325 can be easily done because of the structure that the tubular part 325 is detachably attached to the first opening 330 and the second opening 331.

(H) In the reel unit 202, the tubular part 225 includes the penetrating part 224 having the second through hole 224a. The second through hole 224a penetrates through the mechanism attachment space 2d in the back-and-forth direction, while being continuing to the first opening 230 and the second opening 231. The penetrating part 224 is sealed to be liquid-tight with respect to the mechanism attachment space 2d.

When the guard member 226 is fixed to the chassis 202a in the reel unit 202, the boss 226a of the guard member 226 is inserted into the second through hole 224a from the rear side. Under the condition, the screw member 227 is inserted into the second through hole 224a from the front side and is screwed into the boss 226a. Accordingly, the guard member 226 is fixed to the chassis 202a. The penetrating part 224 is herein sealed to be liquid-tight with respect to the mechanism attachment space 2d. Therefore, liquid is prevented from entering the mechanism attachment space 2d through the penetrating part 224.

(I) In the reel unit 202 (302), the penetrating part 224 (324) is disposed only in the chassis 202a (302a). In this case, the penetrating part 224 (324) is disposed only in the chassis 202a (302a) without being disposed in the lid member 2b. Therefore, it is not required to provide a structure using another seal member for making the penetrating part 224 (324) liquid-tight with respect to the mechanism attachment space 2d. Therefore, the guard member 226 (326) can be more easily fixed.

(J) In the reel unit 202, the chassis 202a has the protruding part 232 protruding towards the lid member 2b from the inner lateral surface of the chassis 202a. The protruding part 232 is extending along the back-and-forth direction while connecting the front edge and the rear edge of the chassis 202a. The second through hole 224a is disposed within the protruding part 232 while penetrating through the front edge and the rear edge of the chassis 202a along the back-and-forth direction. In this case, it is possible to easily form a structure for making the penetrating part 224 liquid-tight with respect to the mechanism attachment space 2d, because of the structure that the protruding part 232 protruding towards the lid member 2b is disposed within the chassis 202a and the structure that the second through hole 224a is disposed within the protruding part 232 while penetrating the front edge and the rear edge of the chassis 202a. Further, where being fabricated by die forming, the chassis 202a can be fabricated using a simple die configured to be split in the right-and-left direction (i.e., a drive shaft direction) even when the chassis 202a is designed to include the protruding part 232.

(K) In the reel unit 202, the second through hole 224a has the first portion 224b, the second portion 224c and the third portion 224d. The first portion 224b is disposed in the front part of the second through hole 224a and the head 227a of the screw member 227 is inserted in the second through hole 224a. The second portion 224c is disposed in the rear part of the second through hole 224a and the boss 226a is inserted the second through hole 224a. The third portion 224d is disposed between the first portion 224b and the second portion 224c and has a diameter less than that of the first portion 224b and that of the second portion 224c.

In the second through hole 224a, the head 227a of the screw member 227 is inserted into the first portion 224b while being held by the step produced between the first portion 224b and the third portion 224d. Further, the boss 226a is inserted into the second portion 224c. The length of the boss 226a is preferably set for producing a clearance between the tip of the boss 226a and the step produced between the second portion 224c and the third portion 224d.

(L) In the reel unit 302, the penetrating part 324 is detachably attached to the first opening 330 and the second opening 331. In this case, attaching of the penetrating part 324 can be easily done due to the structure that the penetrating part 324 is attached to the first opening 330 and the second opening 331.

(M) The spinning reel includes the spool 4, the rotor 3 for winding the fishing line onto the spool 4, and the drive gear 11 for driving the rotor 3. In the reel unit 2, the tubular part 25 is disposed in a position where it is opposed to the drive gear 11 in the axial direction of the drive gear 11. In this case, the tubular part 25 and the drive gear 11 can be disposed in alignment in the axial direction of the drive gear 11. Therefore, the tubular part 25 does not spatially interfere with the drive gear 11. Therefore, increase in diameter of the drive gear 11 can be achieved even when the tubular part 25 is provided.

(N) In the reel unit 2, the chassis 2a has the fishing rod attached portion 2e attachable to a fishing rod. In this case, the chassis 2a with relatively high stiffness is provided with the fishing rod attached portion 2e to which force is applied from the fishing rod during fishing. Therefore, it is easy to reliably obtain such strength as required for the fishing rod attached portion 2e.

(O) The spinning reel 100 includes the reel unit 2, the spool 4, the rotor 3 and the drive gear 11. The spool 4 is mounted to the reel unit 2 while being enabled to reciprocate back and forth. The rotor 3 is rotatably supported by the reel unit 2 for winding the fishing line onto the spool 4.

The spinning reel 100 can implement a spinning reel for achieving the aforementioned advantageous effects.

Other Exemplary Embodiments

An exemplary embodiment of the present invention has been explained. However, the present invention is not limited to the aforementioned exemplary embodiment, and a variety of changes can be herein made without departing from the scope of the present invention. Especially, the plurality of exemplary embodiments and modifications described in the present specification can be arbitrarily used in combination on an as-needed basis.

(a) The first exemplary embodiment describes an O-ring as the second seal member 29. However, the second seal member is not limited to the O-ring. For example, the second seal member can be a ring-shaped sheet packing to be disposed between the wall portion 31c and the bottom portion 25b.

(b) In the first to third exemplary embodiments, the fishing rod attached portion 2e is integrally formed with the chassis 2a. However, the fishing rod attached portion 2e can be integrally formed with the lid member 2b.

(c) In the second exemplary embodiment, the protruding part 232 is protruding from the inner lateral surface of the chassis 202a. However, the present invention is not limited to the structure. For example, the protruding part can be downwardly protruding from the inner top surface of the chassis 202a. It should be noted that in fabricating the cassis 202a by die forming, the protruding part 232 is preferably protruding towards the lid member 2b for avoiding complication of a die to be used.

Advantageous Effects of Invention

According to the present invention, the clearances between the tubular part and the chassis are sealed by the first seal member and the second seal member. Therefore, liquid is prevented from entering the mechanism attachment space from the inside of the tubular part. Further, by the single screw member, the guard member can be fixed to the chassis, while the tubular part can be fixed to the chassis. Accordingly, liquid can be inhibited from entering the mechanism attachment space, while the guard member can be easily fixed without exposing the screw member to the rear side.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A reel unit for a spinning reel, the spinning reel being attachable to a fishing rod, the spinning reel configured to forwardly release a fishing line from a front side of the spinning reel, the reel unit comprising:
   a chassis including a mechanism attachment space at a lateral side thereof, a first opening extending through a front edge of the chassis, and a second opening extending through a rear edge of the chassis, the second opening disposed on an opposite side of the first opening;
   a lid member detachably attached to the chassis to close the mechanism attachment space;
   a guard member including a boss being inserted into the second opening from the rear edge of the chassis, the guard member being attached to the chassis and the lid member from behind to cover the chassis and the lid member;
   a tubular part being disposed between the first opening and the second opening within the mechanism attachment space and arranged to be liquid-tight; and
   a screw member passing through the first opening and being screwed into the boss, the screw member having a head being held inside the tubular part.

2. A reel unit for a spinning reel, the spinning reel being attachable to a fishing rod, the spinning reel configured to forwardly release a fishing line from a front side of the spinning reel, the reel unit comprising:
   a chassis including a mechanism attachment space at a lateral side thereof, a first opening extending through a front edge of the chassis, and a second opening extending through a rear edge of the chassis, the second opening disposed on an opposite side of the first opening;
   a lid member detachably attached to the chassis to close the mechanism attachment space;
   a guard member including a boss being inserted into the second opening from the rear edge of the chassis, the guard member being attached to the chassis and the lid member from behind to cover the chassis and the lid member;
   a tubular part being disposed between the first opening and the second opening within the mechanism attachment space and arranged to be liquid-tight; and
   a screw member passing through the first opening and being screwed into the boss, the screw member having a head being held inside the tubular part,
   the first opening and the second opening continuing to the mechanism attachment space,
   at least a part of the tubular part being disposed between the first opening and the second opening within the mechanism attachment space, and
   the reel unit further including
      a first seal member being configured to seal a clearance between the tubular part and the first opening, and
      a second seal member being configured to seal a clearance between the tubular part and the second opening.

3. The reel for the spinning reel according to claim 2, wherein
   the second opening includes a first hole portion extending through the rear edge of the chassis, a second hole portion extending from the first hole portion towards the front edge of the chassis, and a wall portion through which the second hole portion extends,
   the wall portion includes a surface being disposed perpendicular to the second hole portion,
   the boss is inserted in the first hole portion,
   the screw member includes a threaded shaft passing through the second hole portion,
   the second hole portion has a diameter less than a diameter of the first hole portion,
   the tubular part is disposed within the mechanism attachment space
   the tubular art includes a tube portion disposed in opposition to the first opening, and
   a bottom portion disposed in opposition to the wall portion,
      the head of the screw member is inserted in the tube portion,
      the bottom portion including a first through hole,
      the threaded shaft of the screw member passes through the first through hole,
      the bottom portion is configured to hold the head of the screw member, and
      the first seal member is fitted to the first opening and the tubular part.

4. The reel unit for the spinning reel according to claim 3, wherein
   the first seal member is a truncated cone member made of an elastic material,
   the first seal member includes a first end fitted to the first opening and a second end fitted to the tube portion,
   the first end has a diameter greater than a diameter of the second end.

5. The reel unit for the spinning reel according to claim 3, wherein
   the second seal member is disposed between the wall portion and the bottom portion,
   the tubular part includes a seal attachment portion having a circular shape and protruding from the bottom portion towards the wall portion, and
   the second seal member is attached onto an outer peripheral surface of the seal attachment portion.

6. The reel unit for the spinning reel according to claim 5, wherein
   the second seal member is an O-ring.

7. The reel unit for the spinning reel according to claim 2, wherein
   the tubular part is detachably attached to the first opening and the second opening.

8. A reel unit for spinning reel, the spinning reel being attachable to a fishing rod, the spinning reel configured to forwardly release a fishing line from a front side of the spinning reel, the reel unit comprising:
   a chassis including a mechanism attachment space at a lateral side thereof, a first opening extending through a front edge of the chassis, and a second opening extending through a rear edge of the chassis, the second opening disposed on an opposite side of the first opening;
   a lid member detachably attached to the chassis to close the mechanism attachment space;
   a guard member including a boss being inserted into the second opening from the rear edge of the chassis, the guard member being attached to the chassis and the lid member from behind to cover the chassis and the lid member;

a tubular part being disposed between the first opening and the second opening within the mechanism attachment space and arranged to be liquid-tight; and a screw member passing through the first opening and being screwed into the boss, the screw member having a head being held inside the tubular part, the tubular part including a penetrating part being sealed to be liquid-tight, the penetrating part including a second through hole, the second through hole extending through the mechanism attachment space in a back-and-forth direction, and the second through hole continuing to the first opening and the second opening.

9. The reel unit for the spinning reel according to claim 8, wherein the penetrating part is only provided on the chassis.

10. The reel unit for the spinning reel according to claim 9, wherein the chassis has a protruding part, the protruding part protrudes from an inner lateral surface of the chassis towards the lid member, the protruding part extending along the back-and-forth direction while connecting the front edge and the rear edge of the chassis, and the second through hole is disposed in the protruding part along the back-and-forth direction while extending through the front edge and the rear edge of the chassis.

11. The reel unit for the spinning reel according to claim 9, wherein the penetrating part is detachably attached to the first opening and the second opening.

12. The reel unit for the spinning reel according to claim 8, wherein the second through hole includes: a first portion disposed in a front part thereof, a second portion disposed in a rear part thereof, a third portion disposed between the first portion and the second portion, the head of the screw member is inserted in the first portion, the boss is inserted in the second portion, the shaft of the screw member is inserted in the third portion, and the third portion has a diameter less than a diameter of the first portion.

13. The reel unit for a spinning reel according to claim 1, wherein the spinning reel includes a spool, a rotor being configured to wind the fishing line onto the spool, and a drive gear being configured to drive the rotor, and the tubular part is positioned in opposition to the drive gear in an axial direction of the drive gear.

14. The reel unit for the spinning reel according to claim 1, wherein the chassis includes a fishing rod attachment portion being attachable to the fishing rod.

15. A spinning reel, comprising:

the reel unit according to claim 1;

a spool being attached to the reel unit to be reciprocally moved back and forth;

a rotor being rotatably supported by the reel unit to wind the fishing line onto the spool; and a drive gear being configured to drive the rotor.

* * * * *